(12) United States Patent
Skuratowicz

(10) Patent No.: US 6,881,252 B2
(45) Date of Patent: Apr. 19, 2005

(54) FIBER-BASED PRODUCT

(75) Inventor: Roman Skuratowicz, Hickory Hills, IL (US)

(73) Assignee: Corn Products International, Inc., Westchester, IL (US)

( * ) Notice: Subject to any disclaimer, the term of this patent is extended or adjusted under 35 U.S.C. 154(b) by 24 days.

(21) Appl. No.: 10/668,950

(22) Filed: Sep. 23, 2003

(65) Prior Publication Data

US 2005/0061204 A1 Mar. 24, 2005

(51) Int. Cl.[7] .................... C09D 101/28; C09J 101/28
(52) U.S. Cl. ................... 106/162.5; 106/162.51; 106/162.81; 106/162.8
(58) Field of Search .................. 106/162.5, 162.51, 106/162.8, 162.81

(56) References Cited

U.S. PATENT DOCUMENTS

| | | | |
|---|---|---|---|
| 2,749,336 A | 6/1956 | Boddicker et al. | 260/231 |
| 3,015,572 A | 1/1962 | Casey et al. | 106/197 |
| 3,723,413 A | 3/1973 | Chatterjee et al. | 260/232 |
| 4,015,067 A | 3/1977 | Liu et al. | 536/96 |
| 4,175,996 A | 11/1979 | Battard et al. | 156/336 |
| 4,221,823 A | 9/1980 | Pearson et al. | 427/4 |
| 4,272,295 A | 6/1981 | Linke | 106/157 |
| 4,297,144 A | 10/1981 | Klein et al. | 106/197 |
| 4,378,049 A * | 3/1983 | Hsu et al. | 166/295 |
| 4,492,729 A | 1/1985 | Bannerman et al. | 428/283 |
| 4,526,961 A | 7/1985 | Perplies et al. | 536/98 |
| 4,568,714 A | 2/1986 | Overholt | 524/25 |
| 4,853,437 A | 8/1989 | Lukach et al. | 525/54.21 |
| 4,890,444 A | 1/1990 | Vander Giessen et al. | 55/498 |
| 5,358,559 A | 10/1994 | Fitt et al. | 106/213 |
| 5,369,155 A | 11/1994 | Asmus | 524/55 |
| 5,503,668 A * | 4/1996 | Giesfeldt et al. | 106/217.7 |
| 5,801,239 A | 9/1998 | Saikia et al. | 536/124 |
| 5,895,557 A | 4/1999 | Kronzer | 162/168.1 |
| 5,932,639 A | 8/1999 | Eden et al. | 524/48 |
| 5,939,544 A | 8/1999 | Karstens et al. | 536/124 |
| 6,352,845 B1 | 3/2002 | Buchanan et al. | 435/105 |
| 6,368,443 B1 * | 4/2002 | Fitt et al. | 156/205 |
| 6,388,069 B1 | 5/2002 | Buchanan et al. | 536/72 |
| 2001/0020091 A1 | 9/2001 | Buchanan et al. | 536/123 |
| 2001/0021387 A1 | 9/2001 | Krammer et al. | 424/401 |

* cited by examiner

*Primary Examiner*—David Brunsman
(74) *Attorney, Agent, or Firm*—Norris, McLaughlin & Marcus

(57) ABSTRACT

Fiber-based products and adhesives comprising the fiber-based products. The fiber-based products comprise carboxymethyl cellulose, carboxymethylated hemicellulose and carboxymethylated starch. The fiber-based product is obtained by simultaneously performing alkali extraction of hydrocolloid from the fiber and carboxylation, with a carboxymethylating agent, thereby converting extracted cellulose to carboxymethyl cellulose and also carboxymethylating some extracted hemicellulose, starch, and hemicellulose-cellulose complexes.

33 Claims, No Drawings

FIBER-BASED PRODUCT

BACKGROUND OF THE INVENTION

1. Field of the Invention

The invention pertains to a fiber-based product comprising carboxymethyl cellulose, carboxymethylated hemicellulose and carboxymethylated starch. The fiber-based product is obtained by simultaneously performing alkali extraction of hydrocolloid from the fiber and carboxymethylation, with a carboxymethylating agent, thereby converting extracted cellulose to carboxymethyl cellulose and also carboxymethylating some extracted hemicellulose and starch. The fiber-based product may be used in adhesives, such as corrugating adhesives and laminating adhesives as well as other applications. The invention also concerns adhesives comprising the fiber-based product.

2. The Prior Art

Carboxymethyl cellulose is usually prepared by etherifying cellulose with alkyl monochloracetates. For example, U.S. Pat. No. 4,526,961 describes a method for preparing water-soluble carboxymethyl cellulose comprising the steps of alkalizing cellulose to produce alkali cellulose and then etherifying the alkali cellulose with an etherifying mixture having alkyl monochloroactetate in the presence of an organic solvent. The carboxymethyl cellulose is generally obtained from "clean" cellulose feedstock and thus there are minimal, if any, other carboxylated materials in the carboxymethyl cellulose.

Starch-based products, such as adhesives, may contain carboxymethyl cellulose. For example, U.S. Pat. No. 4,272,295 discloses a starch-based adhesive comprising a lypophilic colloid, which may be carboxymethyl cellulose among others, and partially gelatinized starch. U.S. Pat. No. 5,503,668 discusses the replacement of some or all of the starch component of a corrugating adhesive with solubilized fiber and addresses that an optional carbohydrate component can be added. Carboxymethyl cellulose is listed among a number of materials as a carbohydrate component of the adhesive described in U.S. Pat. No. 5,503,668, and modified starch is disclosed as the preferred carbohydrate for the adhesive formulation of U.S. Pat. No. 5,503,668.

Adhesives are used in a variety of industries and trades to bond substances together. Adhesives are used for laminating materials, e.g. bonding pieces of material together to form a structural unit like in the furniture industry where a layer of decorative material may be bonded to wood. Adhesives also have an important role in the corrugating industry.

In the corrugating process, adhesive is commonly applied to the tips of the flutes of a corrugated medium. Then a non-corrugated flat paper liner is applied against the adhesive coated flutes as they pass between a corrugating roll and a pressure roll. The resulting product has the corrugating medium on one side and a flat liner on the other side and is called a single-face portion. The single-face portion may be used "as is" (called a "single-face" board) or adhesive may be applied to the flute tips of the single-face portion and a second flat sheet can be applied in the same manner as the first in what is called a "double-face" or a "double-back" operation. The second liner sheet is treated with heat and reduced pressure (relative to the pressure used to make a single-face portion) immediately following contact with the adhesive coated flutes as they pass between a corrugating roll and a pressure roll.

Starch-based adhesives, which can be of the carrier, no-carrier and carrier no-carrier type, are commonly used in processes for manufacturing corrugated paper board. In carrier type adhesives, a portion of the starch (or dextrin) forms a carrier, often known as the gelatinized phase, which suspends the balance of the starch which is in an ungelatinized state. Under conditions of heat and pressure, the ungelatinized starch is rapidly hydrated and gelatinized to increase quickly the viscosity and adhesivity of the adhesive composition. In no-carrier type adhesives, all of the starch is slightly cooked or swollen with heat and caustic soda for viscosity. Finally, carrier no-carrier type adhesives have a portion of the starch which forms a carrier and is responsible for about one half of the viscosity and the remaining viscosity is obtained by slightly swelling the uncooked starch.

Starch based corrugating adhesives of the carrier, no-carrier and carrier no-carrier type comprising added hemicellulose are described U.S. Pat. No. 5,358,559. Adhesive compositions where the hemicellulose is extracted from corn fiber in situ during the process of preparing the carrier phase are discussed in U.S. Pat. No. 6,368,443 B1.

We have discovered that extracting hemicellulose by either dry or wet reaction with alkali with simultaneous carboxymethylation results in the carboxymethylation of extracted cellulose, hemicellulose and fiber. The resulting fiber-based product comprises hemicellulose, carboxymethyl cellulose (same or all of which is in the form of a carboxymethylated hemicellulose-cellulose complex), carboxymethylated hemicellulose and carboxymethylated starch. Adding purified carboxymethyl cellulose to an adhesive does not result in an adhesive having other carboxymethylated components (e.g. carboxymethylated hemicellulose and carboxymethlated starch).

We have further discovered that adhesives comprising the fiber-based product have improved bonding properties. Cellulose from the hemicellulose extraction acts as a diluent in adhesive under high shear conditions which negatively affects the bonding properties of adhesive. The fiber-based product from the simultaneous alkali extraction and carboxymethylation, or the simultaneous alkali extraction and carboxymethylation when making adhesive, results in carboxymethylated components that contribute tack and viscosity to the adhesive which improves bonding. Also, the fiber-based product in the corrugating adhesive will eliminate, or reduce, the amount of boron containing compounds needed for the adhesive.

In the present Specification all parts and percentages are on a weight by weight basis based on the total amount of components in a composition of matter, unless otherwise specified. The term "by weight of solids" means the weight percent of the component based on the total weight of solid material in the composition of matter.

SUMMARY OF THE INVENTION

The fiber-based product is obtained by the simultaneous solubilization of fiber by alkali extraction and carboxymethylation. During the alkali extraction, the hydrocolloid, e.g. hemicellulose, is solubilized from the fiber along with a cellulose fraction. A carboxymethylating agent, such as monochloroacetic acid or its salt, is used during the alkali extraction to substantially or completely convert the cellulose to carboxymethyl cellulose. The process also results in the carboxymethylation of some of the extracted hemicellulose and starch in the fiber, as well as hemicellulose-cellulose complexes that are solubilized. Thus, the fiber-based product comprises some or all of carboxymethyl cellulose, carboxymethylated hemicellulose, carboxymethylated starch, and carboxymethylated hemicellulose-cellulose complexes in addition to some or all of the solubilized hemicellulose, cellulose and hemicellulose-cellulose complexes.

The fiber-based product may be used as an additive to an adhesive, such as a corrugating adhesive or laminating adhesive, or may be formed as a component of an adhesive when the adhesive is formulated from fiber. The adhesives of the invention comprise, at least, starch, hydrocolloid, the components of the fiber-based product described herein, caustic, and water. The adhesives may also comprise boron containing compound, waterproofing or water resistant resins and other additives and fillers, such as biocides, defoamers, and performance enhancing additives, including liquid additives, polyvinyl alcohol or latexes and the like. However, the fiber-based product allows the elimination of, or reduction in, amount of boron containing compound in the adhesive.

DETAILED DESCRIPTION OF THE INVENTION

The fiber-based product comprises from about 5% to about 80%, by weight of solids, hydrocolloid, a portion of which may be carboxmethylated. The fiber-based product may be an additive, in either dry or liquid form, for use in adhesives and other applications requiring carboxymethyl cellulose, carboxymethyl starch, or similar hydrocolloids.

The preferred hydrocolloid is hemicellulose and may be in the form of carboxymethylated hemicellulose. Other hydrocolloid includes hydrocolloid materials added to the fiber-based product either before or after carboxymethylation, including those selected from the group consisting of gum arabic, xanthan gum, gum karaya, tragacanth, sodium alginates, carageenan, Guar gum, Locust bean gum, tara, pectins, gellan and combinations thereof. The preferred amount of hydrocolloid is about 60% to about 80%, by weight of solids. The hemicellulose in the invention is preferably extracted from corn fiber, and during the extraction about 40% to about 60% of the corn fiber solids become solubilized. Some of the cellulose may also be in the form of a hydrocolloid-cellulose complex, such as a hemicellulose-cellulose complex, some or all of which may be carboxymethylated.

The fiber-based product also comprises about 20% to about 70%, by weight of solids, cellulose. All or some of the cellulose portion includes solubilized cellulose from the fiber that is converted to carboxymethyl cellulose and cellulose that has undergone at least partial carboxymethyl substitution, both during the alkali extraction of hydrocolloid from the fiber and simultaneous carboxymethylation.

The invention also encompasses an adhesive composition comprising the fiber-based product, and in this embodiment, the adhesive composition comprises from about 15% to about 40% starch, about 0.1% to about 10% of the fiber-based additive as discussed above, sufficient alkali to obtain a pH of about 10 to about 14 and water. The additive eliminates the need for the addition of boron containing compound, however, if necessary for particular applications, up to about 2% boron containing compound, such as commercial boric acid (ortho boric acid, $H_3BO_3$ and its hydrated forms $H_3BO_3 \cdot H_2O$) and borax (sodium tetraborate decahydrate, $Na_2B_4O_7 \cdot 10H_2O$ and other hydrate and anhydrous forms), may be added. The adhesive may optionally comprise about 0.1% to about 10% polyvinyl alcohol, up to about 5% waterproofing or water resistant resins, up to about 5% biocides and up to about 5% performance enhancing compounds such as latex emulsion-based acrylics and copolymers of styrene. Preferably, the fiber-based product forms a component of the carrier portion of an adhesive comprising a carrier, however, no-carrier type adhesives are also within the scope of the invention.

Any type of hydrocolloid may be used in the invention, however, hemicellulose is preferred. Some or all of the hydrocolloid in the fiber-based product is etherified to carboxymethyl hemicellulose. Hemicelluloses are described in U.S. Pat. No. 5,358,559 which is incorporated herein in its entirety by reference. Purified forms of hemicellulose may be used. The hemicellulose may be chemically or enzymatically modified hydrocolloids, such as cellulose derivatives and enzymatically treated hemicellulose, like those referred to in U.S. Pat. No. 5,358,559 that are available under the trade name CELLACE from Nihon Shokuhin Kako Co. Ltd., Tokyo, Japan. The hemicellulose may be a purified hemicellulose of cellulose derived from corn. Preferably, the hemicellulose in the adhesive is obtained in-situ by alkali extraction with simultaneous conversion of the cellulose to carboxymethyl cellulose, as discussed herein.

Fiber sources include spent flake fiber, corn hull fiber, or other vegetable or seed fibers, preferably rich in hemicellulose. Suitable corn fibers include crude fiber, typically described as feed, and more finished products such as dietary corn fiber which is made for human consumption. Crude fiber or feed generally contains from about 20% to about 40% hemicellulose and dietary corn fiber generally contains from about 50% to about 80% hemicellulose. Other sources of fiber may also be used, such as tapioca, wheat, sage, bagasse and the like, and combinations thereof.

Any strong base can be used for the alkali in the extraction. Preferably, however, alkali metal hydroxides, such as sodium hydroxide, potassium hydroxide, calcium hydroxides and the like, are used. Combinations of alkalis may also be used.

Carboxymethyl cellulose is cellulose ether and in the invention, the carboxymethyl cellulose is preferably obtained by etherifying cellulose during the alkali extraction of hemicellulose from the corn fiber. Any chemical suitable for converting the cellulose and other materials to carboxymethyl cellulose under alkali conditions may be used as the carboxymethylating agent. Monochloroacetic acid and salts of monochloroacetic acid are the preferred carboxymethylating agents. The amount of carboxymethylating agent will depend on the solids content and the desired level of substitution. Generally from about 5% to about 70%, by weight of solids, of carboxymethylating agent is used.

Both natural unmodified starch and modified starch can be used in the adhesive. Any starch appropriate for use in adhesives may be used and dextrin, as well as combinations of starch types, dextrin types and combinations of starches and dextrin. In embodiments where the fiber-based additive is made in-situ, some or all of the starch will be completely or partially etherified to form carboxymethylated starch in the adhesive composition.

Unmodified starch is a commodity chemical produced from the root, stem or fruit from a number of plants. It is a high molecular weight carbohydrate polymer which is comprised of linear and branched polysaccharide polymers and it can have moisture content from about 8% to about 20%, most commonly from about 11% to about 13%. Starches such as those derived from corn, wheat, barley, tapioca, rice, potato and/or other plant source, and the like are suitable, as are hybrids. Blends of starches from various sources also can be used. Pearl starches and powdered starches may be used.

The modified starch which is used in accordance with the invention can be mechanically, chemically or heat modified. Compared to unmodified starches, modified starches frequently possess superior physical properties such as increased solubility, better film forming, increased whiteness, improved gel strength, viscosity stability, increased adhesivity, improved resistance to shear and increased resistance to freeze-thaw degradation. Starches derived from other genetic forms of corn, such as high amylose and waxy corn, as well as sorghum varieties, would also be suitable. Chemically modified starches useful in the invention include modified oxidized starch such as hypochlorite-oxidized starch, acid thinned starches, cross-bonded starch, etherified starches, esterified-starches and others which have reduced molecular weight, high fluidity and/or functional sub groups.

Examples of chemically modified starches which can be used in the invention and are commercially available are SUREBOND® Industrial Corn Starch or STABLEBOND® Industrial Corn Starch. These modified starches have residual carboxyl functionality and extreme uniformity and are available from Corn Products International, Inc., Westchester, Ill., USA ("Corn Products").

Polyvinyl alcohol is a polyhydroxy secondary alcohol derived from a series of vinyl alcohol monomer units which by themselves do not exist. The polymer is manufactured first as polyvinyl acetate. Its molecular weight can be controlled by varying the polymerization conditions. The average molecular weight generally ranges from about 9,000 to 186,000 molecular weight units, but can be lower or higher. Depending on the polymer properties which are desired for a particular application, the acetate is then hydrolyzed, but not necessarily to completion. The degree of hydrolysis can theoretically range from 0 to 100%, but commercially available products generally range from about 78% to 100% (which means there can be anywhere from 0 to about 22% residual acetate functionality present in the polyvinyl alcohol in commercially available products). The chemistry and properties of polyvinyl alcohol are discussed in detail in the Encyclopedia of Polymer Science and Technology, Volume 14, Chapter V (John Wiley & Sons, Inc., 1971) which is incorporated in its entirety herein by reference.

The polyvinyl alcohol which is used in accordance with the invention is cold water soluble, has a molecular weight of less than about 30,000, preferably less than about 15,000, and most preferably less than about 11,000 molecular weight units, and has a degree of hydrolysis of greater than about 90%, preferably greater than about 92%. Suitable commercially available polyvinyl alcohols include those from Celanese Chemicals, Dallas, Tex., USA under the tradename CELVOL®; however, polyvinyl alcohol from other manufacturers and suppliers may also be used. The viscosity of the polyvinyl alcohols used in accordance with the present invention range from about 2 centipoise to about 20 centipoise, preferably from about 2 centipoise to about 4 centipoise, at a temperature of 68° F. (20° C.) in a 4% aqueous solution.

The adhesive may optionally comprise waterproofing resins, for example, any waterproofing resins appropriate for corrugated boards may be used. The cross-linking action reduces the hydrophilic nature and water-solubility of the starch, hemicellulose, and other polyhydroxy molecules by effectively removing the availability of hydroxyl groups to water and by developing hydrophobic, aliphatic cross-linking moieties. Condensation products from the reaction of a ketone and aldehyde compounds are suitable. These resins are characterized as polyether polymers, but can contain a variety of other monomers such as urea, melamine, and the like. Waterproofing resins available from the Harper/Love Adhesive Corporation, Charlotte, N.C., USA ("Harper/Love") under the trade names AQUASEAL PLUS™, AQUASEAL™ and HYDRATITE™ may be used in the invention.

The adhesives may, optionally, include biocides. Any composition appropriate for retarding microbial growth in adhesives may be used in the invention. Preferred biocides are those available from Harper/Love under the HARLO-CIDE™ trade name. Biocides available from The Dow Chemical Company, Midland, Mich., USA under the trade name DOWCIL®, particularly DOWCIL®75, may also be used.

The fiber-based product can be made by combining at least fiber, alkali and a carboxymethylating agent, such as monochloroacetic acid or its salt, in a mixer and mixing at high shear. Preferably about 20% to about 70% fiber, e.g. corn fiber, about 10% to about 70% alkali, about 10% and about 70% carboxymethylating agent and water (q.s. 100%) are combined in a means for mixing at a temperature of about 15° C. to about 95° C. The additive may also be made in a semi-dry process, e.g. extraction of hemicellulose from fiber with alkali at moisture content from about 10% to about 60%, preferably from about 15% to about 50%, and most preferably from about 20% to about 40%. The semi-dry process comprises the steps of agitating the fiber in a highly fluidized state with alkali and monochloroacetic acid or its salt with relatively low amounts of moisture (water). In either process, during the mixing, hemicellulose and cellulose are extracted from the fiber and are converted into carboxymethyl cellulose and carboxymethyl hemicellulose by the carboxymethylating agent, which may also convert other materials during the reaction, resulting in a fiber based product comprising, some or all of hemicellulose, cellulose, carboxymethyl cellulose, carboxymethylated hemicellulose and carboxymethylated starch and carboxymethylated hemicellulose-cellulose complexes. The fiber-based product may be thinned by enzymes or other chemicals which reduces the viscosity and allows larger addition rates to adhesives.

The additive can also be formed in the process for making an adhesive. For example, no-carrier adhesives can be made by admixing, for about 5 minutes to about 60 minutes, corn fiber in a mixer with the alkali, carboxymethylating agent, e.g. monochloroacetic acid or its salt, starch, and water, and any other ingredients of the adhesive compositions and mixing at elevated temperature to cook the starch. Sufficient alkali must be added to attain a pH from about 10 to about 14, preferably from about 12 to about 14.

Extraction of hydrocolloid from fiber and use in an adhesive has the negative effect, when large quantities of hydrocolloid are added, that the remaining cellulose acts as a diluent and under high shear when making an adhesive and contributes viscosity but not tack to adhesives. Conversion of the cellulose from the alkali extraction of corn fiber to carboxymethyl cellulose eliminates this negative effect and significantly improves bonding because the diluent effect of the cellulose is either eliminated or decreased and the carboxymethyl cellulose formed in the process contributes both tack and viscosity to the adhesive. Also, the simultaneous solubilization of fiber and carboxymethylation results in carboxymethylation of other solubilized components of the fiber such as hemicellulose, starch and hemicellulose-cellulose complexes providing further tack and visiosity to the adhesive.

EXAMPLES

Example 1

Fifteen grams of dry milled corn fiber are dispersed in 400 milliliters of isopropyl alcohol. Forty milliliters of a 30% sodium hydroxide solution is added with mixing over a 30 minute time period with continued mixing at about 800 rpms for an additional hour. Next, 18 grams of monochloroacetic acid is added with mixing over a 30 minute time period. The mixture is covered and heated in an oven for 3½ hours at 55° C. This mixture is decanted, dispersed in 70% methanol solution and neutralized with glacial acetic acid. The mixture is then filtered and washed with 70% methanol and anhydrous methanol, then dried on steam and in an oven at 60° C. The resulting material comprising hemicellulose, carboxymethylated hemicellulose and carboxymethyl cellulose is soluble in water.

Example 2

A cellulose fraction obtained from the alkali extraction of hemicellulose from fiber will include some hemicellulose irreversibly bound to the cellulose in the form of a hemicellulose-cellulose complex. A purified form of hemicellulose-cellulose complex, extracted from corn fiber (i.e. corn cellulose) was obtained by alkali treatment of corn fiber, removal of soluble hemicellulose components, bleaching and purification. The procedure described in Example 1 is applied to the purified hemicellulose-cellulose complex (corn-cellulose) thus obtained, and the resulting material has a degree of carboxymethyl substitution of 0.7. The resulting material is water soluble.

Example 3

A purified hemicellulose fraction is treated under the conditions of Example 1 to obtain a water soluble material comprising carboxymethylated hemicellulose. This fraction was obtained as the soluble portion of alkali treated corn fiber, and was purified with ethanol precipitation.

Example 4

Fifteen grams of dry milled corn fiber is treated with 24 grams of 50% sodium hydroxide solution and 22 grams of 80% monochloroacetic acid in a WARING® blender at medium speed. The resulting dough is heated in an oven for 4 hours at 55° C.

Example 5

A corrugating adhesive was made in a two stage Stein Hall mixer. A primary portion is made by combining 400 grams of water, 70 grams pearl starch, 20 grams of the material from Example 1, and 26 grams of 50% sodium hydroxide in the mixer and cooking with stirring at 140° F. for 15 minutes. The mixture was then quenched with 300 milliliters of cooling water and stirred for an additional 10 minutes. In a separate container, a secondary portion is made by slurrying 1,100 milliliters of water and 500 grams of unmodified starch. The primary portion is added to the secondary portion with stirring over a period of 20 minutes, and the complete mixture is then allowed to stir for 10 minutes. This adhesive provides superior tack compared to a similar adhesive, made without the material of Example 1 but including 10 grams of 10 molar borax in the secondary portion.

Example 6

A starch adhesive is prepared in a laboratory high shear mixer by stirring 3 kilograms of water at 115° C. with 360 grams unmodified starch and 114 grams of 50% sodium hydroxide solution for 120 seconds at 3500 rpm. Next, 5 kilograms of water and 3 kilograms of unmodified starch are added and mixing is continued for 180 seconds.

In a separate vessel, the material from Example 1 is dissolved in water to 15% solids. Three hundred grams of the 15% solution from Example 1 is added to the starch adhesive.

Example 7

A starch adhesive is prepared in a laboratory high shear mixer by stirring 3 kilograms of water at 115° C. with 360 grams unmodified starch and 114 grams of 50% sodium hydroxide solution for 120 seconds at 3500 rpm. Then, 20 grams of 10 molar borax is added to the high shear mixer and mixing is continued for an additional 120 seconds. Next, 5 kilograms of water and 3 kilograms of unmodified starch are added and mixing is continued for 180 seconds.

In a separate vessel, the material from Example 1 is dissolved in water to 15% solids. Three hundred grams of the 15% solution from Example 1 is added to the starch adhesive.

Example 8

A laminating adhesive is made by cooking a water soluble adhesive (Casco 070610 available from the Canada Starch Company, Inc. (CASCO), Etobicoke, Ontario, Canada), at 35% solids at 160° F. for 20 minutes. The water soluble adhesive comprises dextrin. The material from Example 1 is added to the heated adhesive at a level of 15% based on the dextrin dry basis.

What is claimed is:

1. A fiber-based product comprising hydrocolloid and a cellulose portion having at least some of the hydrocolloid converted to carboxymethyl hydrocolloid and at least some of the cellulose converted to carboxymethyl cellulose.

2. The fiber-based product of claim 1 wherein the hydrocolloid and the cellulose portion are obtained by simultaneous solubilization of fiber by alkali extraction and carboxymethylation with a carboxymethylating agent.

3. The fiber-based product of claim 2 further comprising carboxymethylated starch and carboxymethylated hydrocolloid-cellulose complexes.

4. The fiber-based product of claim 1 wherein the hydrocolloid is selected from the group consisting of hemicellulose, gum arabic, xanthan gum, gum karaya, tragacanth, sodium alginates, carageenan, Guar gum, Locust bean gum, tara, pectins, gellan and combinations thereof.

5. The fiber-based product of claim 1 wherein the hydrocolloid is derived from fiber is selected from the group consisting of spent flake fiber, corn hull fiber and crude fiber.

6. The fiber-based product of claim 1 wherein the hydrocolloid is purified hemicellulose of cellulose derived from corn.

7. The fiber-based product of claim 1 wherein the amount of the hydrocolloid is from about 5% to about 80%, by weight of solids, and the amount of the cellulose portion is from and about 20% to about 70%, by weight of solids.

8. The fiber-based product of claim 1 wherein the carboxymethylating agent is monochloroacetic acid or salts of monochloroacetic acid.

9. The fiber-based product of claim 1 in dry form or liquid form.

10. An adhesive comprising the fiber-based product of claim 1.

11. The adhesive of claim 10 comprising from about 15% to about 40% starch, about 0.1% to about 10% of the fiber-based product, sufficient alkali to obtain a pH of about 10 to about 14 and water.

12. The adhesive of claim 11 further comprising ingredients selected from the group consisting of up to about 2% boron containing compound, about 0.1% to about 10% polyvinyl alcohol, up to about 5% waterproofing or water resistant resins, up to about 5% biocides and up to about 5% performance enhancing compounds.

13. The adhesive of claim 10 having no boron containing compound.

14. The adhesive of claim 10 wherein the hydrocolloid is selected from the group consisting of hemicellulose, gum arabic, xanthan gum, gum karaya, tragacanth, sodium alginates, carageenan, Guar gum, Locust bean gum, tara, pectins, gellan and combinations thereof.

15. The adhesive of claim 10 further comprising carboxymethylated starch and carboxymethylated hydrocolloid-cellulose complexes.

16. The adhesive of claim 15 wherein the starch is selected from the group consisting of corn, wheat, barley, tapioca, rice, potato, high amylose corn starch, waxy corn starch, acid thinned starch, hypochlorite-oxidized starch, etherified starch, esterified starch and cross-bonded starch.

17. The adhesive of claim 10 in the form of a corrugating adhesive or a laminating adhesive.

18. A method of making a corrugated board comprising joining by bonding a corrugated board to at least one liner using the adhesive of claim 10.

19. The corrugated board made by the method of claim 18.

20. A fiber-based product comprising hydrocolloid and a cellulose portion wherein the hydrocolloid and the cellulose portion are obtained by simultaneous solubilization of fiber by alkali extraction and carboxymethylation with a carboxymethylating agent during which at least some of the hydrocolloid is converted to carboxymethylated hydrocolloid, at least some of the cellulose is converted to carboxymethyl cellulose and carboxymethylated starch and carboxymethylated hydrocolloid-cellulose complexes are formed.

21. A process for making a fiber-based product comprising the steps of combining at least about 20% to about 70% fiber, about 10% to about 70% alkali, about 10% and about 70% carboxymethylating agent in a means for mixing at a temperature of about 15° C. to about 95° C. and mixing the contents at high shear wherein at least hydrocolloid and cellulose are extracted from the fiber and some or all of the extratcted hydrocolloid and cellulose are carboxymethylated.

22. The process of claim 21 wherein starch and hydrocolloid-cellulose complexes are extracted from the fiber and some or all of the extratcted starch and hydrocolloid-cellulose complexes are carboxymethylated.

23. The process of claim 21 wherein the moisture content during the mixing is from about 10% to about 60%.

24. The process of claim 23 wherein the mixing is in a highly fluidized state.

25. The process of claim 21 wherein the carboxymethylating agent is monochloroacetic acid or salts of monochloroacetic acid.

26. The process of claim 21 wherein the hydrocolloid is selected from the group consisting of hemicellulose, gum arabic, xanthan gum, gum karaya, tragacanth, sodium alginates, carageenan, Guar gum, Locust bean gum, tara, pectins, gellan and combinations thereof.

27. The process of claim 21 wherein the fiber is selected from the group consisting of spent flake fiber, corn hull fiber and crude fiber.

28. A process for making an adhesive comprising the steps of admixing at least fiber, sufficient alkali to attain a pH from about 10 to about 14, carboxymethylatng agent, starch, and water in a means for mixing and mixing for about 5 minutes to about 60 minutes at high shear wherein at least hydrocolloid and cellulose are extracted from the fiber and some or all of the extracted hydrocolloid and cellulose are carboxymethylated.

29. The process of claim 28 wherein the starch is cooked.

30. The process of claim 28 comprising the additional step of adding other components selected from the group consisting of polyvinyl alcohol, boron containing compounds, waterproofing resins, water resistant resins, biocides and performance enhancing compounds to the means for mixing prior to mixing.

31. The process of claim 28 wherein the carboxymethylating agent is monochloroacetic acid or salts of monochloroacetic acid.

32. The process of claim 28 wherein the hydrocolloid is selected from the group consisting of hemicellulose, gum arabic, xanthan gum, gum karaya, tragacanth, sodium alginates, carageenan, Guar gum, Locust bean gum, tara, pectins, gellan and combinations thereof.

33. The process of claim 28 wherein the fiber is selected from the group consisting of spent flake fiber, corn hull fiber and crude fiber.

* * * * *